US007299978B2

(12) United States Patent
Park et al.

(10) Patent No.: US 7,299,978 B2

(45) Date of Patent: Nov. 27, 2007

(54) BILL DEPOSIT AND WITHDRAWAL APPARATUS

(75) Inventors: Chang Ho Park, Gumi-Si (KR); Gun Chang Lee, Buk-Gu Daegu (KR)

(73) Assignee: Nautilus Hyosung Inc., Seoul (KR)

(*) Notice: Subject to any disclaimer, the term of this patent is extended or adjusted under 35 U.S.C. 154(b) by 227 days.

(21) Appl. No.: 11/134,283

(22) Filed: May 23, 2005

(65) Prior Publication Data

US 2006/0144922 A1 Jul. 6, 2006

(30) Foreign Application Priority Data

Dec. 30, 2004 (KR) ...................... 10-2004-0117351

(51) Int. Cl.
*G06Q 40/00* (2006.01)

(52) U.S. Cl. ...................................................... 235/379

(58) Field of Classification Search ................ 235/379, 235/383; 271/3.12, 3.05, 4.01
See application file for complete search history.

(56) References Cited

U.S. PATENT DOCUMENTS

| | | | | |
|---|---|---|---|---|
| 5,719,383 | A * | 2/1998 | Forrest | 235/379 |
| 5,909,814 | A * | 6/1999 | Arikawa | 209/534 |
| 6,637,647 | B2 * | 10/2003 | Katou et al. | 235/379 |
| 6,978,928 | B2 * | 12/2005 | Shibata et al. | 235/381 |
| 7,066,384 | B2 * | 6/2006 | Yokoi et al. | 235/379 |
| 7,090,121 | B2 * | 8/2006 | Wanibe et al. | 235/379 |

* cited by examiner

*Primary Examiner*—Ahshik Kim
(74) *Attorney, Agent, or Firm*—Fish & Richardson P.C.

(57) ABSTRACT

The present invention provides a bill deposit and withdrawal apparatus comprising a shutter for opening and closing a bill-receiving space; a first plate for forming a front wall of the bill-receiving space and guiding transfer of a bill input into the bill-receiving space; a second plate spaced apart by a predetermined distance from the first plate to define the bill-receiving space; a third plate provided between the first and second plates to partition the bill-receiving space into two spaces; and a fourth plate provided below the bill-receiving space to transfer the bill stacked in the bill-receiving space toward a separator, whereby high reliability is achieved by avoiding jamming and the like that may occur when deposited bills are separated, bills to be withdrawn are stacked, bills rejected upon deposit of bills are stacked, or untaken bills are recovered.

8 Claims, 10 Drawing Sheets

BILL DEPOSIT AND WITHDRAWAL APPARATUS

BACKGROUND OF THE INVENTION

1. Field of the Invention

The present invention relates to a bill deposit and withdrawal apparatus, and more particularly, to such a bill deposit and withdrawal apparatus with a deposit/withdrawal unit, which has superior operability and high reliability upon deposit and discharge of a bill through the apparatus.

2. Description of the Related Art

In general, a bill deposit and withdrawal apparatus is used by banks or other financial institutions in order to provide a convenient banking service to their customers. The bill deposit and withdrawal apparatus is installed in convenience stores or public places in addition to the premises of the banks or financial institutions, and is configured such that customers can deposit or withdraw cash money conveniently whenever needed, using a cash card or a credit card.

In such a bill deposit and withdrawal apparatus, upon deposit of bills, the bills input by a user are separated one by one by a separator unit and then transferred by a transfer unit. The transferred bill is checked about falsification and the like. If the bill is not approved for deposit, it is rejected and returned to the user. Thus, a deposit/withdrawal unit should have a bill-stacking function. As methods of implementing such a function, a temporary storage unit may be provided for storing the rejected bills which in turn are stacked in the deposit/withdrawal unit after all bills are dispatched and separated. Alternatively, the rejected bills may be stacked directly in the deposit/withdrawal unit just after rejected, without providing a temporary storage unit.

Furthermore, the deposit/withdrawal unit of the bill deposit and withdrawal apparatus has a function by which if bills rejected upon deposit of bills or bills stacked in the deposit/withdrawal unit upon withdrawal thereof are not taken by a user, the untaken bills are recovered into a recovery unit.

Such conventional bill deposit and withdrawal machines with the aforementioned functions are installed in financial institutions, convenience stores, public places and the like, and then operated in an unattended state all day long. Thus, they necessitate high reliability for user's cash deposit and withdrawal transactions. Further, they should avoid frequent mal-operations or failures due to jamming or the like during a deposit or withdrawal process.

SUMMARY OF THE INVENTION

Accordingly, the present invention is conceived to solve the aforementioned problems. An object of the present invention is to provide a bill deposit and withdrawal apparatus with a deposit/withdrawal unit, which has high reliability by avoiding jamming and the like that may occur when deposited bills are separated, bills to be withdrawn are stacked, bills rejected upon deposit of bills are stacked, or untaken bills are recovered.

According to the present invention for achieving the object, there is provided a bill deposit and withdrawal apparatus, comprising a shutter for opening and closing a bill-receiving space; a first plate for forming a front wall of the bill-receiving space and guiding transfer of a bill input into the bill-receiving space; a second plate spaced apart by a predetermined distance from the first plate to define the bill-receiving space; a third plate provided between the first and second plates to partition the bill-receiving space into two spaces; and a fourth plate provided below the bill-receiving space to transfer the bill stacked in the bill-receiving space toward a separator.

The apparatus may further comprise a fifth plate for pressing the bill, which has been transferred toward the separator by the fourth plate, toward the first plate.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

Hereinafter, a preferred embodiment of the present invention will be described in detail with reference to the accompanying drawings.

Figure 1:
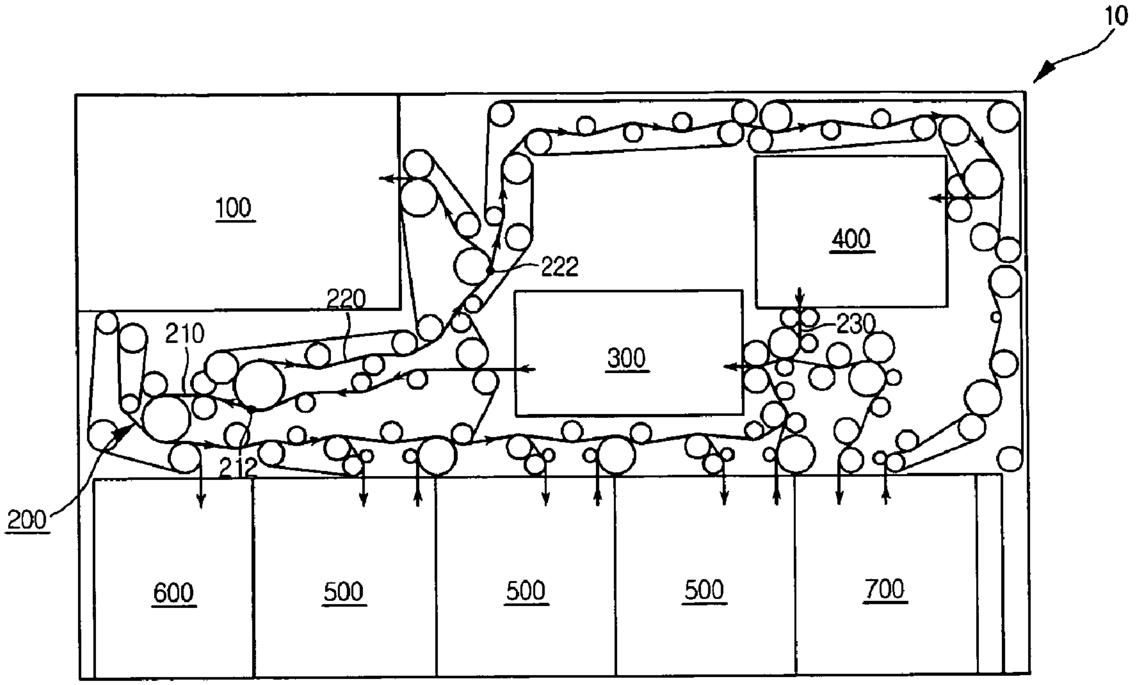
FIG. 1 is a schematic view of a bill deposit and withdrawal apparatus according to the present invention.
Figure 2:
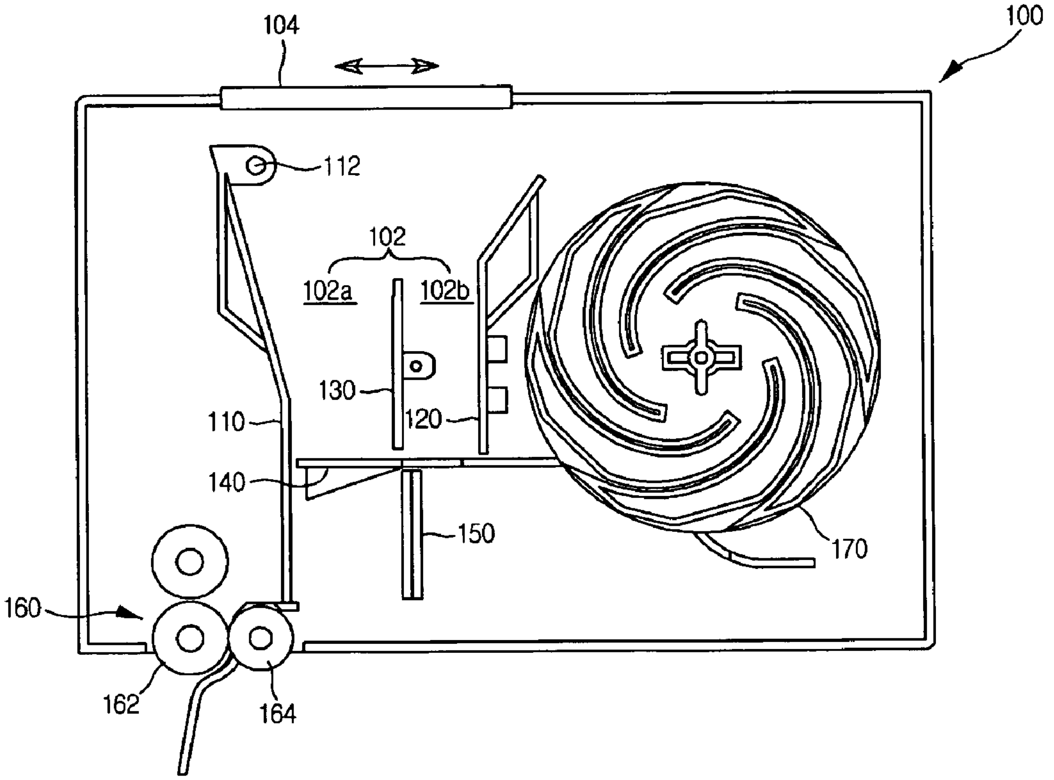
FIG. 2 is a longitudinal sectional view of a deposit/withdrawal unit provided in the bill deposit and withdrawal apparatus according to the present invention.

FIG. 1 is a schematic view of a bill deposit and withdrawal apparatus according to the present invention, and FIG. 2 is a longitudinal sectional view of a deposit/withdrawal unit provided in the bill deposit and withdrawal apparatus according to the present invention.

As shown in these figures, the bill deposit and withdrawal apparatus 10 of the present invention comprises a deposit/withdrawal unit 100 through which a bill is deposited or taken by a user for deposit or withdrawal thereof; a transfer path 200 along which the bill that has been deposited or is to be withdrawn through the deposit/withdrawal unit 110 is transferred; a bill examination/discrimination unit 300 for examining whether there is abnormality in the bill that has been deposited or is to be withdrawn; a temporary storage unit 400 for temporarily storing a bill before being transferred to the deposit/withdrawal unit 100; a bill depository unit 500 for receiving a deposited bill and storing a bill to be withdrawn; a bill recovery unit 600 for receiving a bill that has not been taken by the user through the deposit/withdrawal unit 100; and a bill supplementing unit 700 for storing a bill, which has been supplied to the bill depository unit 500 but further transferred to the bill supplementing unit due to lack of the capacity of the bill depository unit, or a supplementary bill to be transferred to the bill depository unit. Although not shown in the figures, the bill deposit and withdrawal apparatus 10 further comprises a control unit for controlling the entire apparatus.

The bill transfer path in the bill deposit and withdrawal apparatus 10 of the present invention constructed as above will be described below.

Upon deposit of a bill, a bill received and dispatched through the deposit/withdrawal unit 100 is transferred to the bill examination/discrimination unit 300 via a first transfer path 210. When the examination of the bill is completed, the bill is received in the temporary storage unit 400 via a second transfer path 220. Thereafter, upon input of a deposit signal from the control unit, the bill stored in the temporary storage unit 400 is transferred again to the bill examination/discrimination unit 300 through a third transfer path 230 and then reexamined. The bill that has been completely examined is stored in the bill depository unit 500 via the first transfer path 210. Here, a first branch point 212 and a second branch point 222 are provided on the first transfer path 210 and the second transfer path 220, respectively. In the first branch point 212, a bill approved by the bill examination/discrimination unit 300 is directed into the bill depository unit 500. In the second branch point 222, a bill rejected by the bill examination/discrimination unit 300 is returned to the deposit/withdrawal unit 100.

Upon withdrawal of a bill, a bill in the bill depository unit 500 is transferred to the bill examination/discrimination unit 300 through the first transfer path 210. After the examination of the bill is completed, it is moved to the deposit/withdrawal unit 100 through the second transfer path 220.

Meanwhile, the deposit/withdrawal unit 100 through which a user deposits or withdraws a bill will be described in greater detail below with reference to FIG. 2.

The deposit/withdrawal unit 100 is provided with a bill-receiving space 102 into which a bill is input upon deposit thereof or from which a bill is taken upon withdrawal thereof. A shutter 104 is provided for opening and closing the bill-receiving space 102. The shutter 104 is positioned above the bill-receiving space 102, and slidably operated in a direction indicated by an arrow shown in the figure to open and close the bill-receiving space 102.

The bill-receiving space 102 to be opened by the shutter 104 is defined by a first plate 110 forming a front wall thereof and guiding the transfer of a bill received in the bill-receiving space 102, a second plate 120 spaced apart by a predetermined distance from the first plate 110 to define the bill-receiving space 102 therebetween, and a third plate 130 interposed between the first and second plates 110 and 120 to partition the bill-receiving space 102 into a first receiving space 102*a* and a second receiving space 102*b*. In addition, a fourth plate 140 is provided for lowering a bill received in the first receiving space 102*a* upon deposit thereof. A fifth plate 150 is further provided for pressing the bill lowered by the fourth plate 140 toward the first plate.

Below the fourth plate 140 is provided a separator 160 comprising a feed roller 162 and a gate roller 164 that are positioned to be in contact with each other. The feed roller 162 is rotated upon dispatch of a bill so as to transfer the bill to the first transfer path 210, and the gate roller 164 is not rotated and prevents two or more bills from being transferred at a time. The dispatched bill is stored in the temporary storage unit via the bill examination/discrimination unit 300 through the first transfer path 210 (refer to FIG. 1).

At the rear of the bill-receiving space 102, there is provided a stacker 170 for stacking, in the bill-receiving space 102, a bill that will be withdrawal or has been rejected by the bill examination/discrimination unit 300 (see FIG. 1) upon deposit of the bill.

Here, the first plate 110 is configured to pivot on a hinge 112, thereby opening the top of the separator 160 upon dispatch of a bill. The third plate 130 is configured to move toward the first plate 110, i.e., in a forward direction, thereby pressing a bill input into the bill-receiving space 102 upon deposit thereof, or to move in a reverse direction. The forward movement is carried out by the second plate 120, and the reverse movement is performed by an elastic member (not shown). Furthermore, the third plate 130 is placed in contact with the second plate 120 upon withdrawal of a bill and then automatically spaced apart from the second plate 120 by bills that are stacked by the stacker 170, thereby defining the second receiving space 102*b*. The bills stacked in the second receiving space 102*b* are pressed and moved toward the first plate 110 by the second plate 120.

FIGS. 3 to 8 are views illustrating a bill deposit process performed by the deposit/withdrawal unit of the bill deposit and withdrawal apparatus according to the present invention. The bill deposit process performed by the deposit/withdrawal unit 100 will be described below with reference to these figures.

Figure 3:
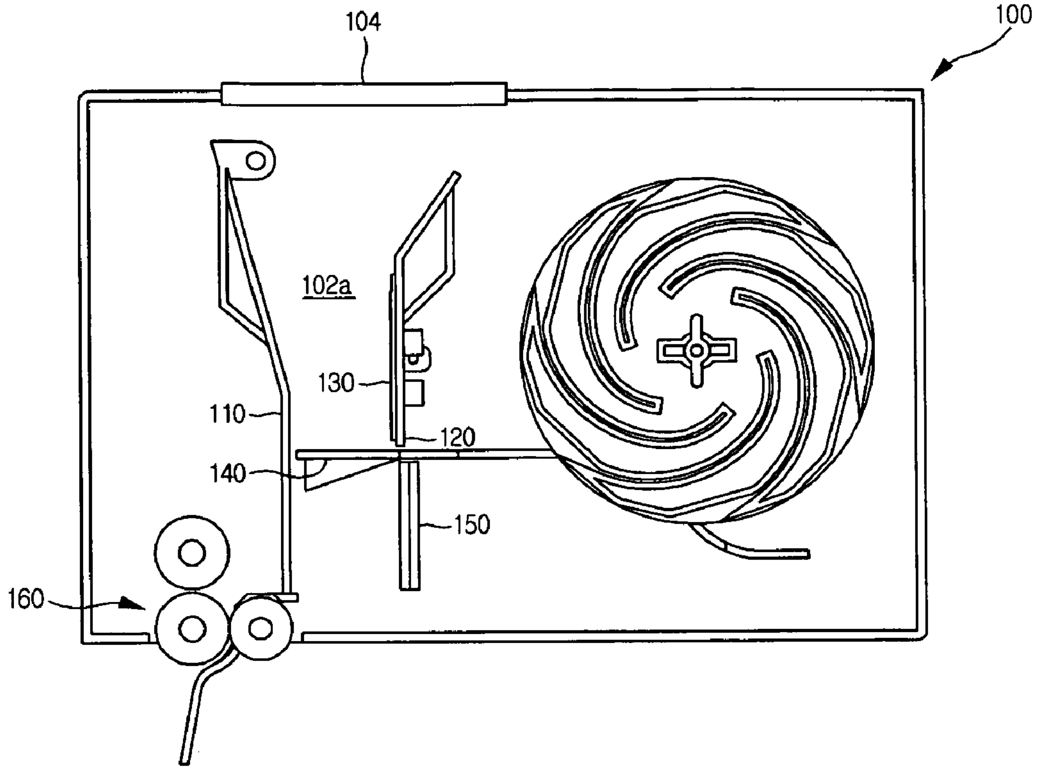
FIGS. 3 to 8 are views illustrating a bill deposit process performed by the deposit/withdrawal unit of the bill deposit and withdrawal apparatus according to the present invention.

FIG. 3 shows an initialized state that is a step of preparing deposit or withdrawal of a bill. As shown in the figure, the first plate 10 pivots to close the top of the separator 160. The second plate 120 and the third plate 130 move to a rear portion of the fourth plate 140, thereby defining the first receiving space 102*a*. At this time, the fourth plate 140 is raised to the same level as a bottom surface of the first receiving space 102*a*, the second plate 120 and the third plate 130 are placed to be in contact with each other, and the shutter 104 positioned above the first receiving space 102*a* remains closed.

Figure 4:
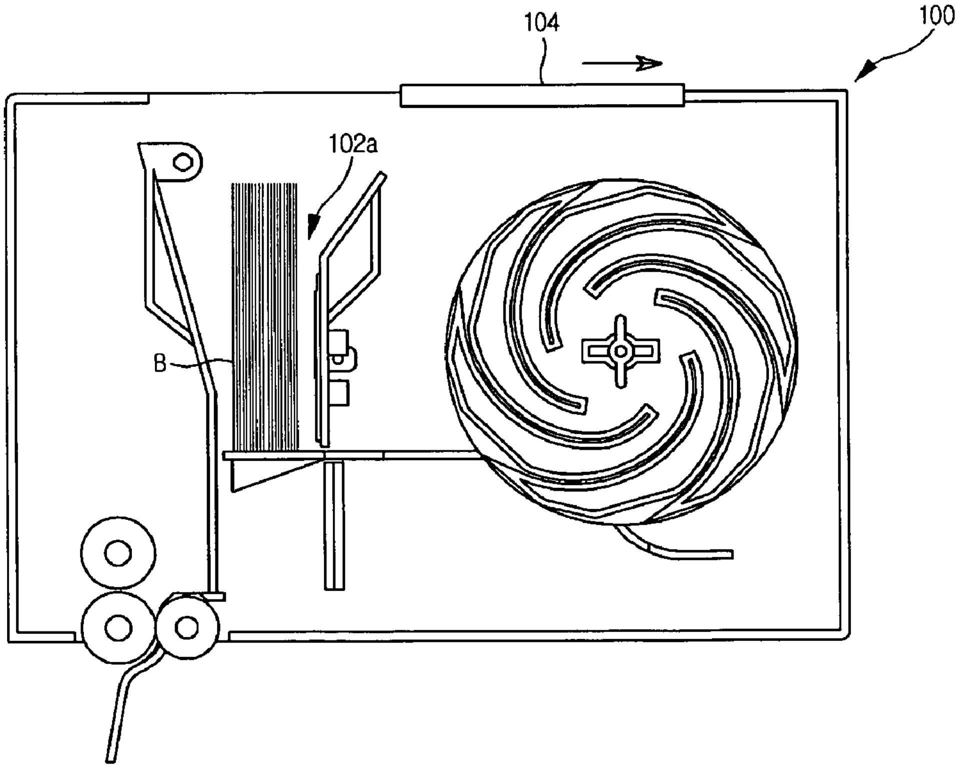

When a user operates the bill deposit and withdrawal apparatus for the purpose of deposit of bills in the initialized state, the shutter 104 is slid in a direction indicated by an arrow shown in FIG. 4 to open the first receiving space 102*a*. The user can input the bills B into the first receiving space 102*a*.

Figure 5:
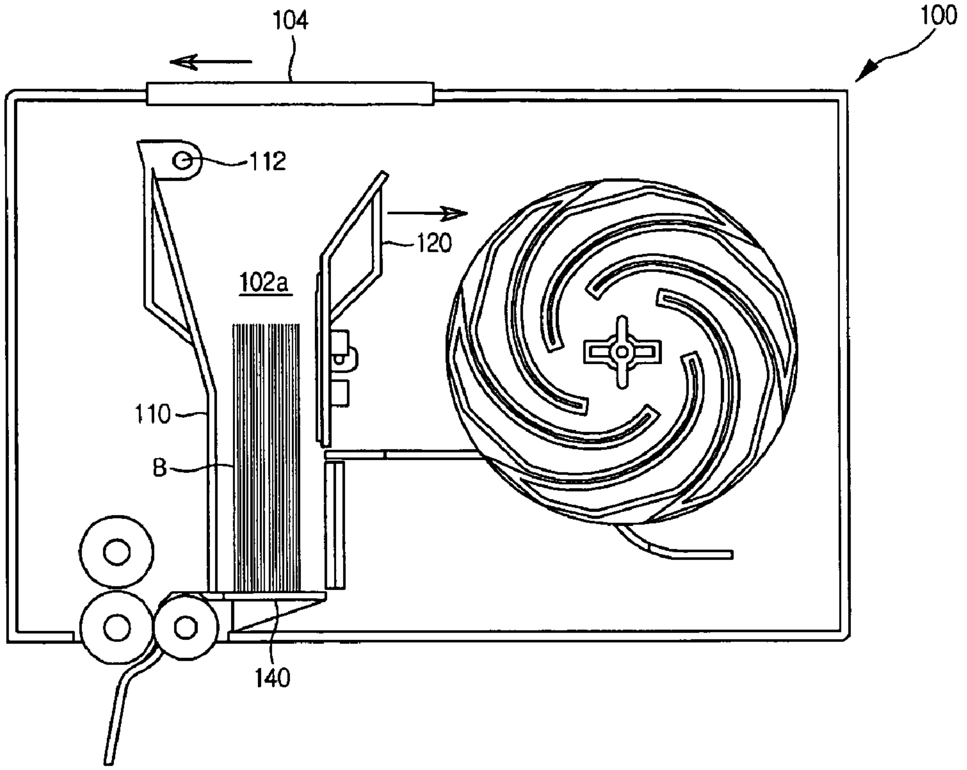
Figure 6:
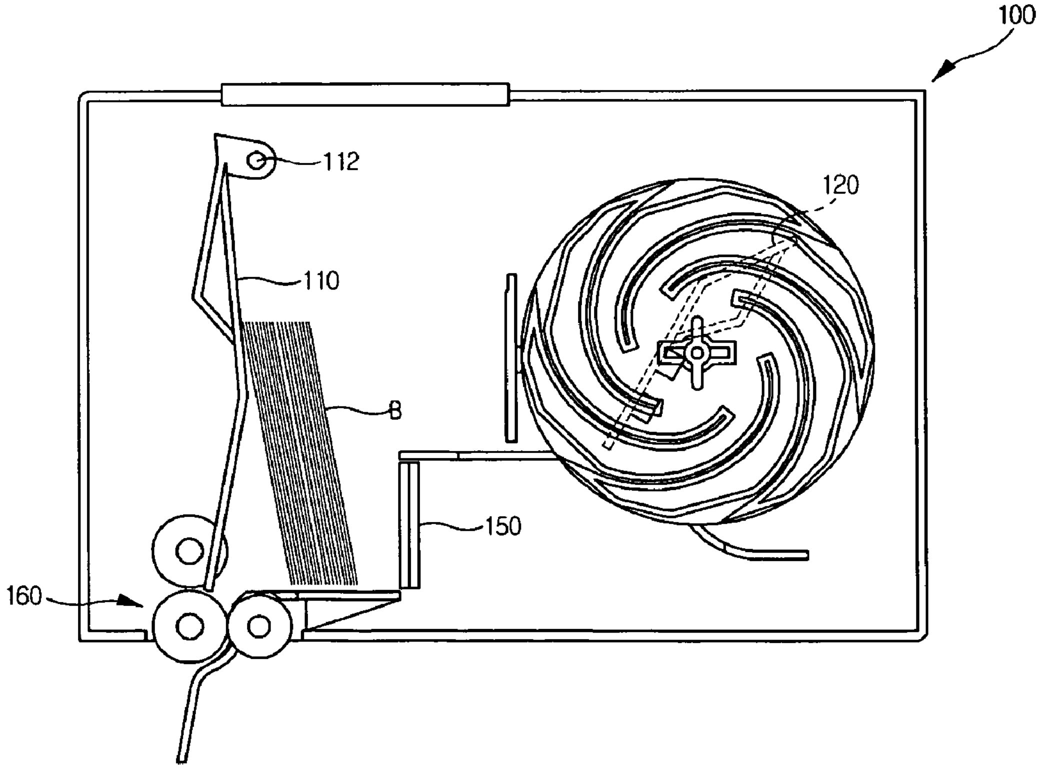
Figure 7:
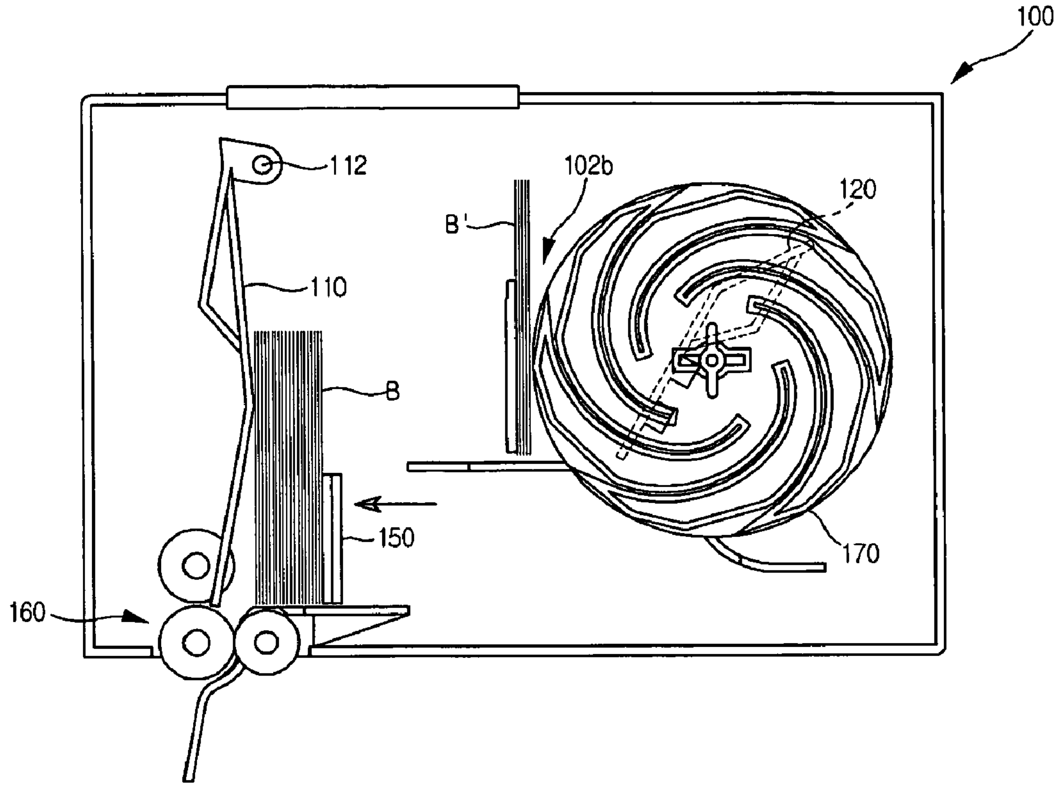

When the bills B are completely input, the deposit/withdrawal unit 100 performs an operation for dispatching the input bills B, as shown in FIGS. 5 to 8. First, the shutter 104 is slid in a direction indicated by an arrow shown in FIG. 5 to close the first receiving space 102*a*. The fourth plate 140 is lowered to move the input bills B to above the separator 160. Although the fourth plate 4 has been illustrated and described as being lowered in a vertical direction in this embodiment, it is not limited thereto but may be configured to be lowered in a forward or backward inclined direction. Then, as shown in FIG. 6, the first plate 110 pivots on the hinge 112 to open the top of the separator 160, and the fifth plate 150 moves toward the first plate 110, i.e. in a direction indicated by an arrow shown in FIG. 7, thereby pressing the bills B as shown in FIG. 7. Then, a bill-dispatching operation is started.

Here, the first plate 110 pivots to open the top of the separator 160, and at the same time, the second plate 120 moves in the direction indicated by the arrow shown in FIG. 5 and then leans backward. This is to collect bills B' rejected by the bill examination/discrimination unit 300 (see FIG. 1), as shown in FIG. 7. The rejected bills B' is stacked in the second receiving space 102*b* by the stacker 170.

Figure 8:
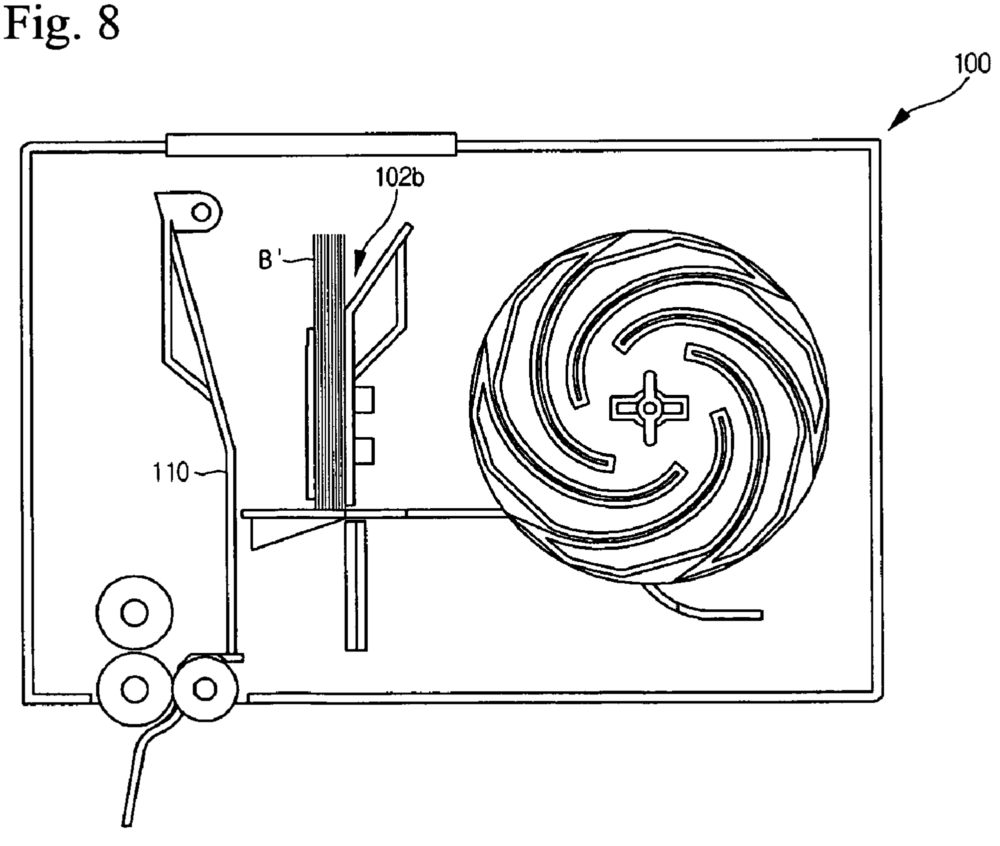

The bills B dispatched as described above are transferred to the bill examination/discrimination unit 300 through the first transfer path 210 shown in FIG. 1. If approved, the bills B are temporarily stored in the temporary storage unit 400 through the second transfer path 220. If a deposit signal is transmitted by the control unit, the bills B are again transferred to the bill examination/discrimination unit 300 and then reexamined. The bills reexamined and approved by the bill examination/discrimination unit 300 are stored in the bill depository unit 500 through the first transfer path 210. However, a bill rejected by the bill examination/discrimination unit 300 is returned to the second receiving space 102*b* of the deposit/withdrawal unit 100 through the second branch point 222 on the second transfer path 220 and then transferred toward the first plate 110, as shown in FIG. 8. At this time, a process of providing the second receiving space 102*b* will be described in detail later.

Figure 9:
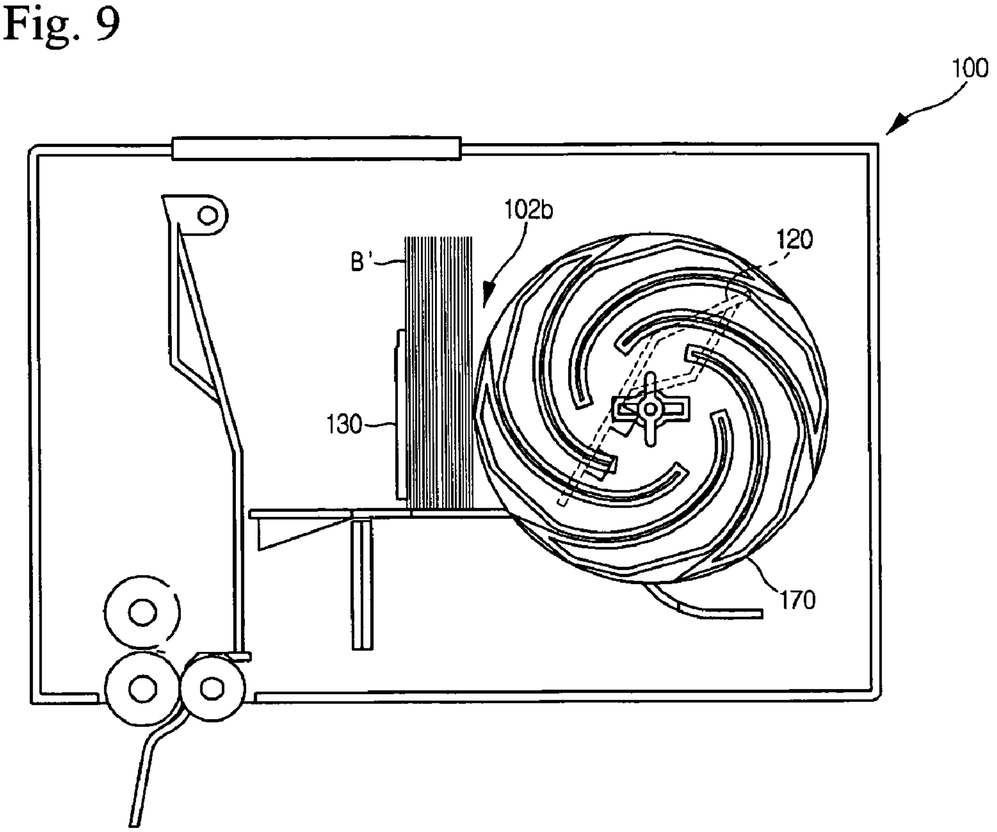
FIGS. 9 and 10 are views illustrating a bill withdrawal process performed by the deposit/withdrawal unit of the bill deposit and withdrawal apparatus according to the present invention.
Figure 10:
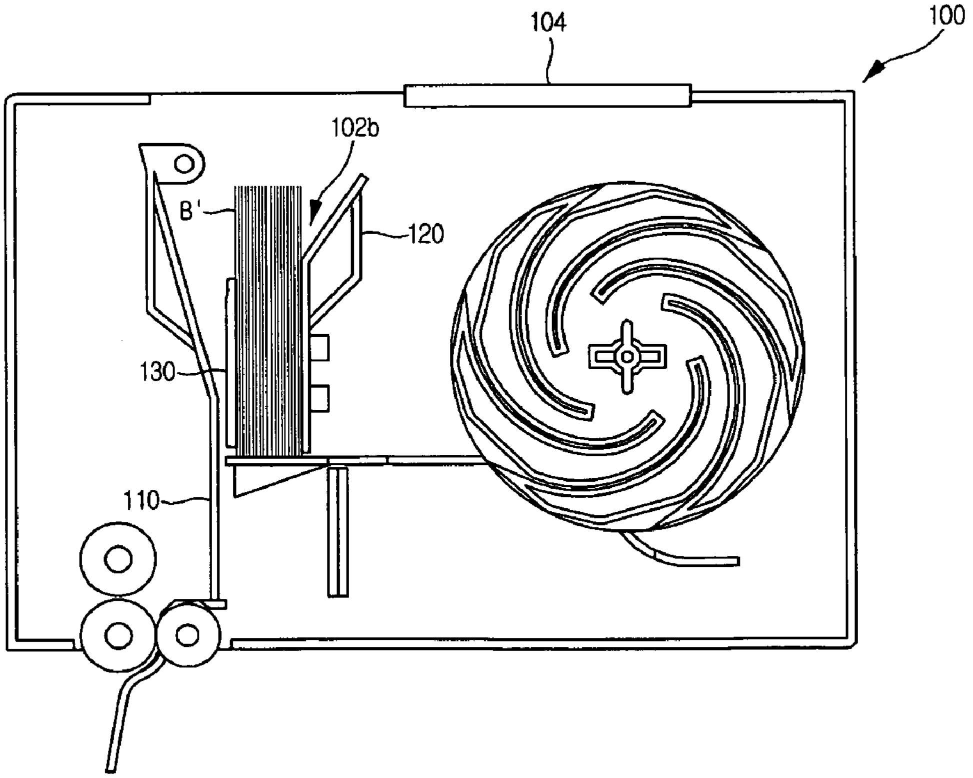

FIGS. 9 and 10 are views illustrating a bill withdrawal process performed by the deposit/withdrawal unit of the bill deposit and withdrawal apparatus according to the present invention.

When a withdrawal signal is transmitted by the control unit in the initialized state of FIG. 3, the second plate 120 and the third plate 130 move to a rear portion of the bill-receiving space 102, and in particular, the second plate 120 leans backward. Contrary to the deposit process, this is to provide a space in which bills to be withdrawn are stacked by the stacker 170, i.e., the second receiving space 102*b*. At this time, the third plate 130 is biased to a rear portion of the deposit/withdrawal unit 100 by the elastic means (not shown in the figures) but moves to a front portion of the deposit/withdrawal unit 100 by the bills B' that are stacked by the stacker 170.

When the bills are completely stacked in the second receiving space 102*b*, as shown in FIG. 10, the bills B' and the third plate 130 are moved toward the first plate 110 by the second plate 120. Then, the shutter 104 is opened so that a user can take the bills B'.

FIGS. 11 to 14 are views illustrating a process of recovering untaken bills, which is performed by the deposit/withdrawal unit of the bill deposit and withdrawal apparatus according to the present invention.

Figure 11:
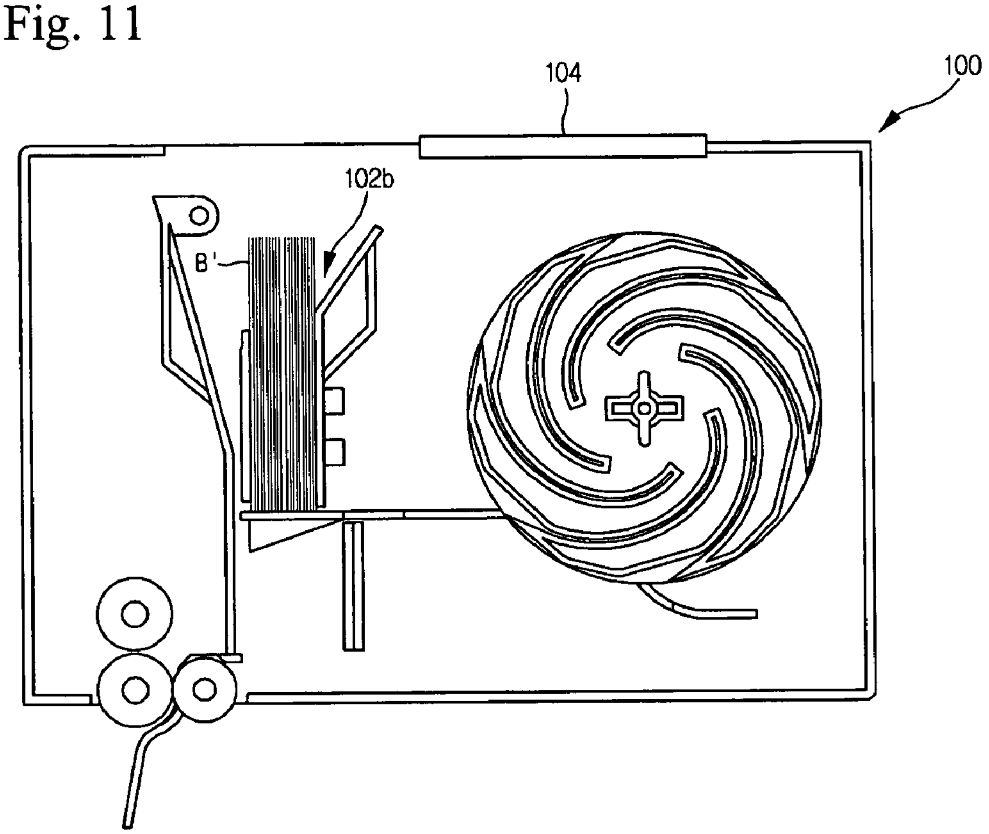
FIGS. 11 to 14 are views illustrating a process of recovering untaken bills, which is performed by the deposit/withdrawal unit of the bill deposit and withdrawal apparatus according to the present invention.

FIG. 11 shows a state where the second receiving space 102*b* is opened by the shutter 104 to allow a user to take the bills B' to be withdrawn or recovered. If the user does not take the bills B' within a certain period of time in the state of FIG. 11, the bills B' are returned to the recovering unit 600 (see FIG. 1). The recovering process will be described below with reference to FIGS. 12 to 14.

Figure 12:
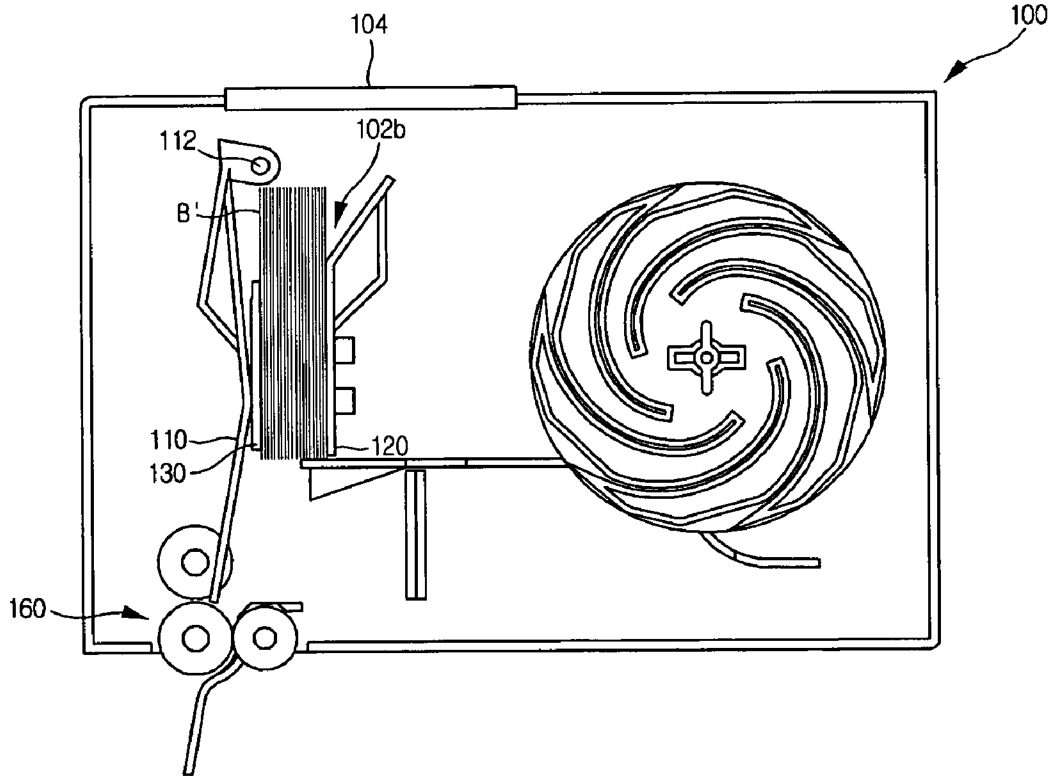

If a certain period of time passes as described above, the shutter 104 is slid to close the receiving space 102*b*, and the first plate 110 pivots on the hinge 112 to open the top of the separator 160, as shown in FIG. 12. At this time, the reason why the bills do not fall down is that the force for moving the second plate and the elastic force of the elastic means (not shown in the figures) exerted on the third plate act in opposite directions.

Figure 13:
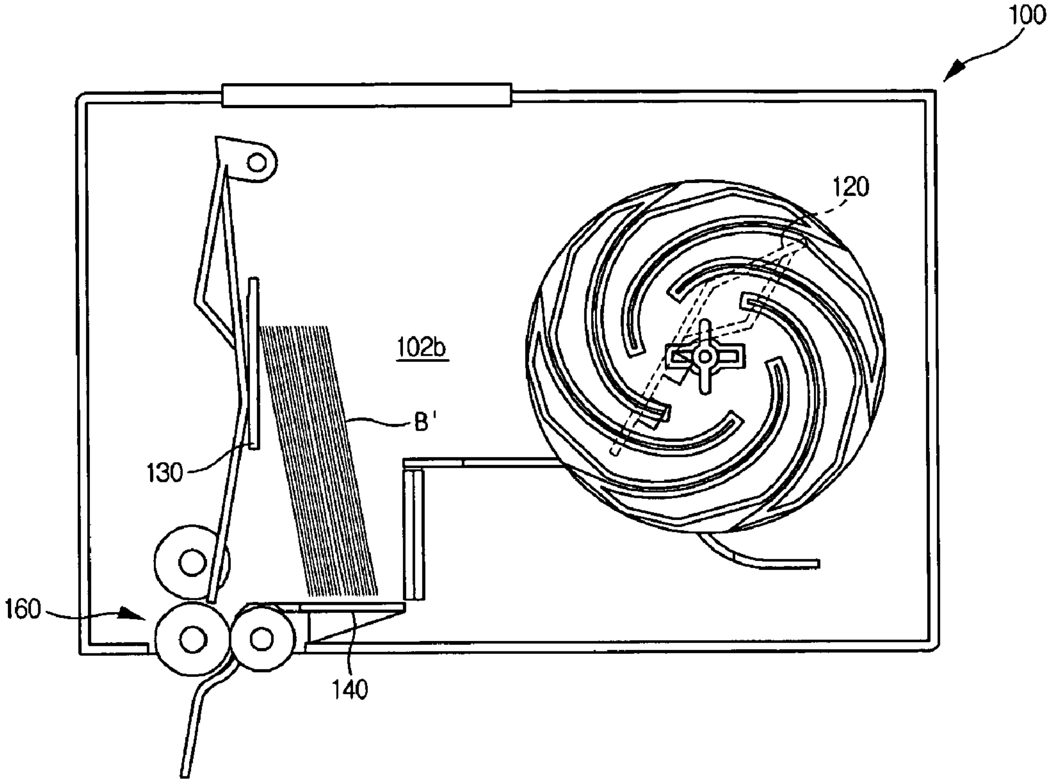
Figure 14:
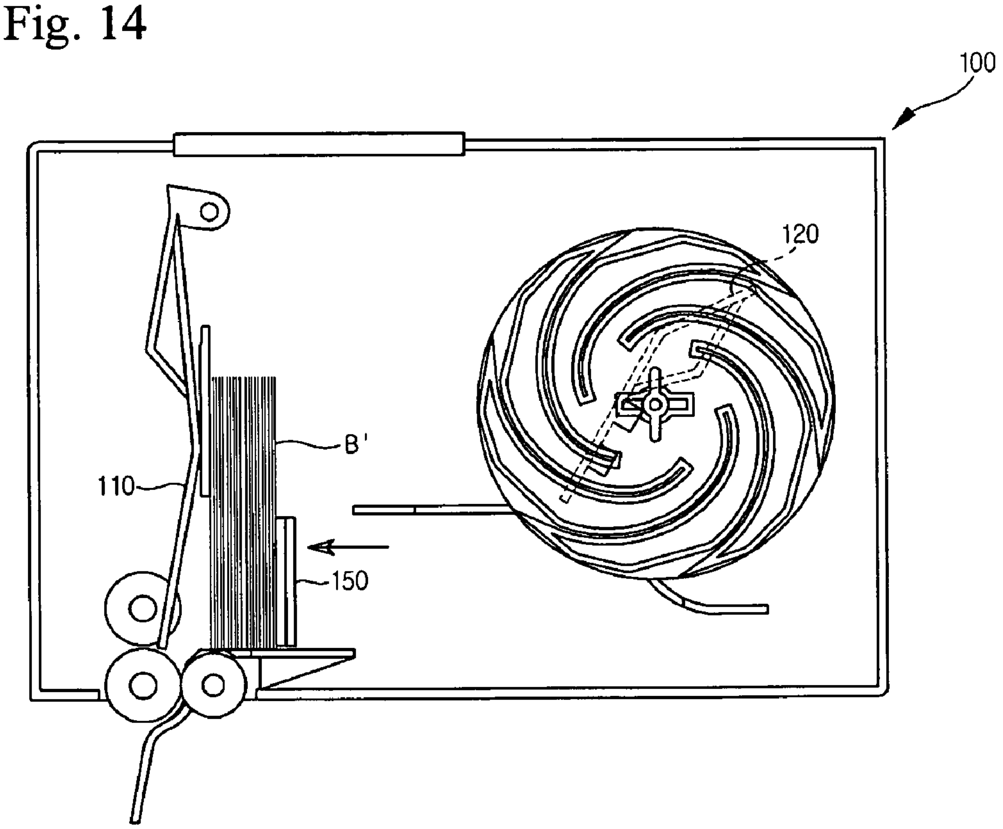

As shown in FIG. 13, the bills B' stacked in the second receiving space 102*b* are lowered to the top of the separator 160 by the fourth plate 140. Thereafter, as shown in FIG. 14, the fifth plate 150 moves toward the first plate 110, i.e., in a direction indicated by an arrow, thereby pressing the bills B'. Then, the dispatching operation is started. At this time, all the dispatched bills B' are returned to the recovering unit 600 (refer to FIG. 1).

FIGS. 15 to 19 are views illustrating a process of recovering a bill when jamming occurs on a transfer path in the bill deposit and withdrawal apparatus according to the present invention.

Figure 15:
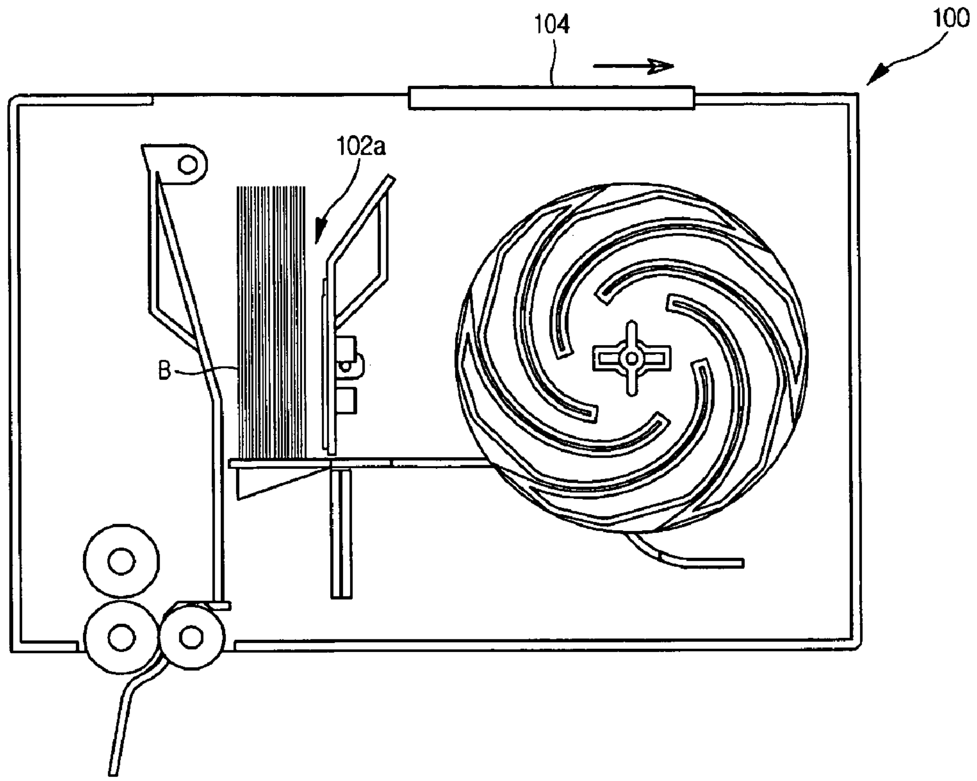
FIGS. 15 to 19 are views illustrating a process of recovering a bill when jamming occurs on a transfer path in the bill deposit and withdrawal apparatus according to the present invention.

When a user operates the bill deposit and withdrawal apparatus for the purpose of deposit of a bill in the initialized state of FIG. 3, the shutter 104 is slid in a direction indicated by an arrow shown in FIG. 15, thereby opening the first receiving space 102*a* and a user then inputs bills B thereinto.

Figure 16:
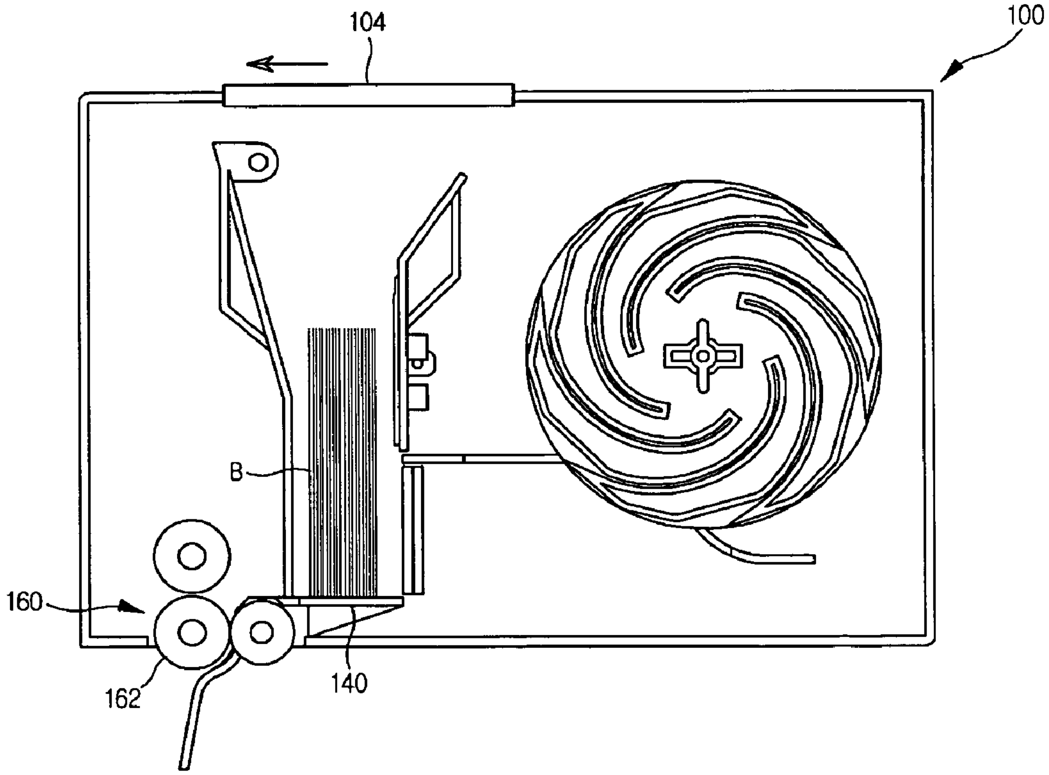
Figure 17:
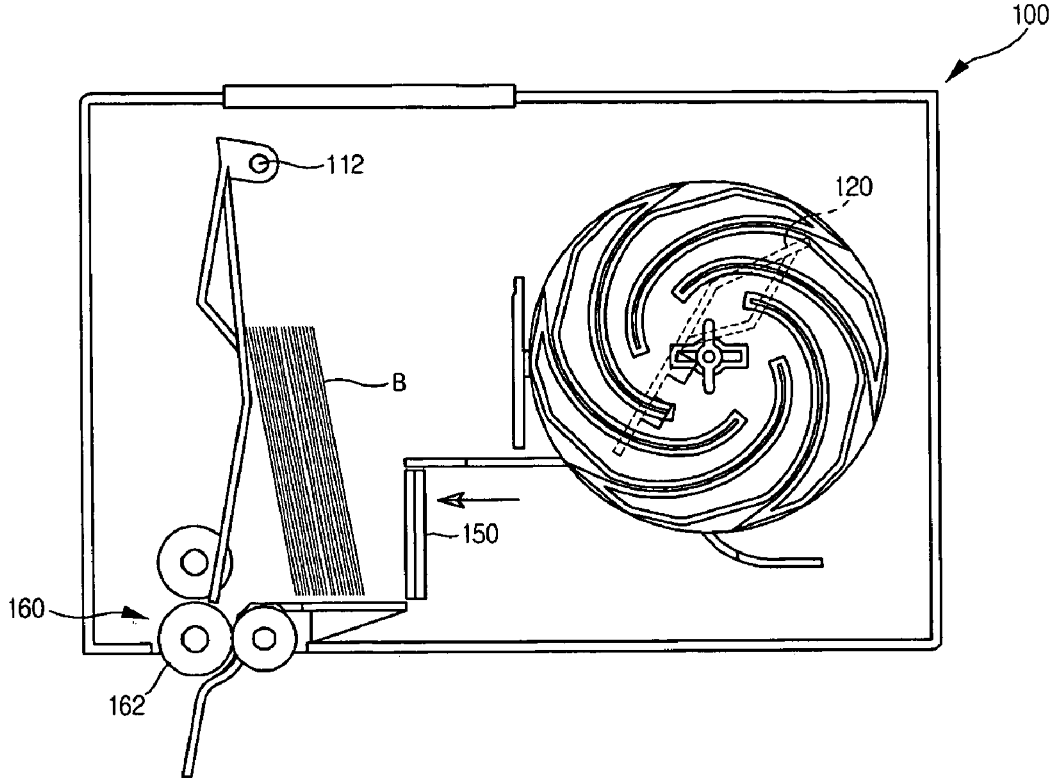
Figure 18:
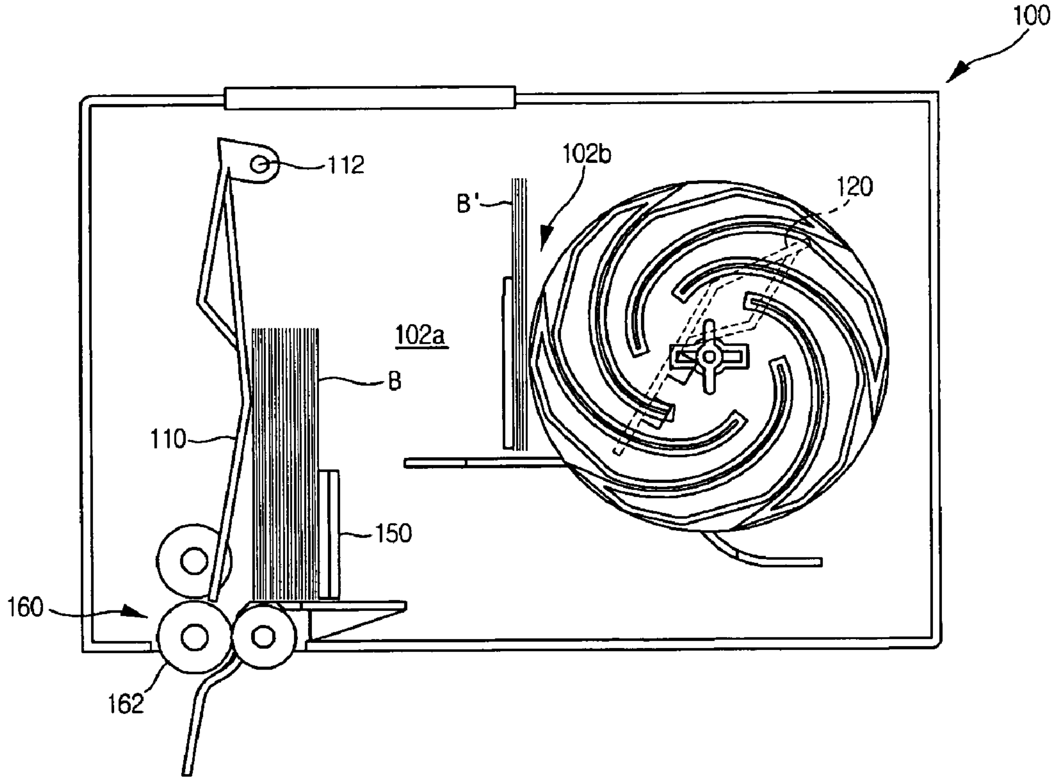

When the bills B are completely input, the deposit/withdrawal unit 100 performs an operation for dispatching the input bills B through the process shown in FIGS. 16 to 18. First, the shutter 104 is slid in a direction indicated by an arrow shown in FIG. 16, thereby closing the first receiving space 102*a*, and the fourth plate 140 is lowered to move the input bills B to the top of the separator 160. Thereafter, as shown in FIG. 17, the first plate 110 pivots on the hinge 112 to open the top of the separator 160. The fifth plate 150 moves toward the first plate 110, i.e., in a direction indicated by an arrow shown in FIG. 18, thereby pressing the bills B as shown in FIG. 18. Then, the operation for dispatching the bills B is started.

Here, the first plate 110 pivots to open the top of the separator 160, and at the same time, the second plate 120 moves in a direction indicated by the arrow shown in FIG. 17 and then leans backward.

Figure 19:
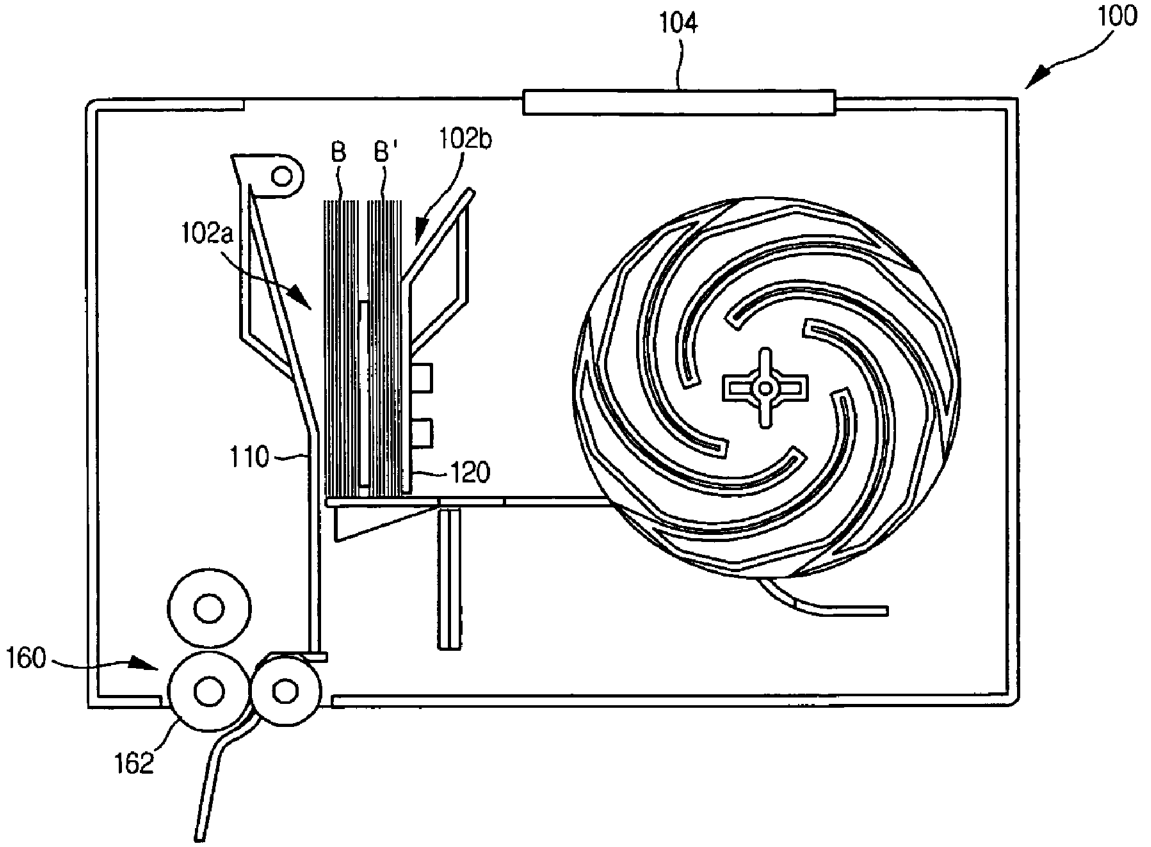

If jamming occurs on the transfer path 200 (refer to FIG. 1) during this process, the feed roller 162 is rotated in a reverse direction to recover a bill B on the transfer path 200 into the first receiving space 102*a*. When the bill B trapped on the transfer path 200 is recovered into the first receiving space 102*a*, all the input bills B and B' are stacked in the first receiving space 102*a* and the second receiving space 102*b*, respectively, and then transferred toward the first plate 110 by the second plate 120, as shown in FIG. 19. Thereafter, the shutter 104 is opened so that the user can take the bills.

As described above, the bill deposit and withdrawal apparatus of the present invention can prevent malfunction or failure caused by jamming and the like that may occur when deposited bills are separated, bills to be withdrawn are stacked, bills rejected upon deposit of bills are stacked, or untaken bills are recovered. Thus, there is an advantage in that the apparatus can provide users with high reliability for bill deposit and withdrawal transactions.

Although the configuration and operation of the bill deposit and withdrawal apparatus according to the preferred embodiment of the present invention have been illustrated and described with reference to the accompanying drawings, they are only for illustrative purposes. It will be readily understood by those skilled in the art that various modifications and changes can be made thereto without departing from the spirit and scope of the present invention defined by the appended claims.

What is claimed is:

1. A bill deposit and withdrawal apparatus including a deposit/withdrawal unit, the deposit/withdrawal unit having a bill-receiving space, a separator for dispatching a bill from the bill-receiving space, and a stacker for stacking a bill in the bill-receiving space, the apparatus comprising:

a shutter for opening and closing the bill-receiving space;

a first plate for forming a front wall of the bill-receiving space and guiding transfer of a bill into the bill-receiving space;

a second plate spaced apart by a predetermined distance from the first plate to define the bill-receiving space;

a third plate provided between the first and second plates to partition the bill-receiving space into two spaces; and a fourth plate configured to be raised to the same level as a bottom surface of the bill-receiving space, and lowered to above the separator to transfer the bill stacked in the bill-receiving space toward the separator.

2. The apparatus as claimed in clam 1, further comprising a fifth plate for pressing the bill, which has been transferred toward the separator by the fourth plate, toward the first plate.

3. The apparatus as claimed in claim 1, wherein the first plate is pivotably installed inside the bill deposit and withdrawal apparatus so as to open the top of the separator upon dispatch of the bill.

4. The apparatus as claimed in claim 3, Wherein the third plate moves in a forward direction in which the third plate presses the bill input into the bill-receiving space toward the first plate, or in a reverse direction, and the forward movement is carried out by the second plate.

5. The apparatus as claimed in claim 4, wherein the third plate is automatically spaced apart from the second plate by the bill stacked by the stacker, and the bill stacked in the spaced space is transferred toward the first plate by the second plate.

6. The apparatus as claimed in claim 2, wherein the first plate is pivotably installed inside the bill deposit and withdrawal apparatus so as to open the top of the separator upon dispatch of the bill.

7. The apparatus as claimed in claim 6, wherein the third plate moves in a forward direction in which the third plate presses the bill input into the bill-receiving space toward the first plate, or in a reverse direction, and the forward movement is carried out by the second plate.

8. The apparatus as claimed in claim 7, wherein the third plate is automatically spaced apart from the second plate by the bill stacked by the stacker, and the bill stacked in the spaced space is transferred toward the first plate by the second plate.

* * * * *